(12) United States Patent
Mudgal et al.

(10) Patent No.: US 11,526,406 B2
(45) Date of Patent: *Dec. 13, 2022

(54) METHOD AND SYSTEM FOR IMPLEMENTING A BACKUP VALIDATION ENGINE

(71) Applicant: JPMORGAN CHASE BANK, N.A., New York, NY (US)

(72) Inventors: Vishal Mudgal, Singapore (SG); James Todd Barnes, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 16/836,458

(22) Filed: Mar. 31, 2020

(65) Prior Publication Data

US 2020/0226032 A1    Jul. 16, 2020

Related U.S. Application Data

(63) Continuation of application No. 15/498,711, filed on Apr. 27, 2017, now Pat. No. 10,621,048.

(60) Provisional application No. 62/328,232, filed on Apr. 27, 2016.

(51) Int. Cl.
*G06F 11/14* (2006.01)
*G06F 16/20* (2019.01)
*G06F 16/2453* (2019.01)

(52) U.S. Cl.
CPC ...... *G06F 11/1464* (2013.01); *G06F 11/1451* (2013.01); *G06F 16/24544* (2019.01); *G06F 2201/84* (2013.01)

(58) Field of Classification Search
None
See application file for complete search history.

(56) References Cited

U.S. PATENT DOCUMENTS

| 7,680,828 | B2 | 3/2010 | Gorelik |
| 7,689,861 | B1* | 3/2010 | Wang ................. G06F 11/1417 714/2 |
| 8,799,051 | B2 | 8/2014 | Brower, Jr. |
| 9,804,957 | B1* | 10/2017 | Chopra ............... G06F 11/3692 |

* cited by examiner

*Primary Examiner* — Belix M Ortiz Ditren
(74) *Attorney, Agent, or Firm* — Greenblum & Bernstein, P.L.C.

(57) ABSTRACT

An embodiment of the present invention is directed to a backup validation engine. The backup validation engine comprises: a plurality of data sources comprising a central asset repository; a central repository of backups data; a central repository of network attached storage, a central application portfolio repository; and central repository of tape backup data; an interface user interface; and a data mapping processor, coupled to the plurality of data sources and interactive user interface, programmed to: access data from each of the plurality of data sources; map data from the plurality of data sources; identify performance issues comprising: duplicate host policies, hosts back-up, missing backup of hosts, duplicate NAS policies, NAS volume backup, and missing NAS backup; generate a backup validation plan to address one or more performance issues; and automatically initiate the backup validation plan.

10 Claims, 7 Drawing Sheets

| | X3CDOGOFASTOPERATE▲ | X3CDOGOSCM▲ | X3CDOGOEQC |
|---|---|---|---|
| ALL_Hosts_In_Brews Fixit | 177 | 231 | 28 |
| DEV_Hosts Fixit | 0 | 0 | 0 |
| UAT_Hosts Fixit | 33 | 5 | 4 |
| PROD/DR_Hosts Fixit | 144 | 226 | 24 |
| Missing_Hosts Fixit | 3 | 5 | 25 |
| Failed_Hosts_Backup Fixit | 0 | 2 | 0 |
| ALL_QTrees_In_Brews Fixit | 92 | 184 | 3 |
| QTrees_DEV_HostAccess Fixit | 5 | 0 | 0 |
| QTrees_UAT_HostAccess Fixit | 9 | 3 | 0 |
| QTrees_PROD_DR_HostAccess Fixit | 78 | 181 | 3 |
| Missing_QTrees Fixit | 87 | 103 | 1 |
| Failed_QTrees_Backup Fixit | 2 | 3 | 0 |
| Dup_Host_Policies Fixit | 6 | 8 | 2 |
| Dup_QTree_Policies Fixit | 8 | 22 | 0 |
| Multiple_Host_Env Fixit | 7 | 3 | 4 |

Figure 5

METHOD AND SYSTEM FOR IMPLEMENTING A BACKUP VALIDATION ENGINE

CROSS REFERENCE TO RELATED APPLICATIONS

This application is a continuation of U.S. application Ser. No. 15/498,711, filed Apr. 27, 2017, which claims the benefit of priority to U.S. Provisional Application 62/328,232, filed Apr. 27, 2016, the content of which are both incorporated herein by reference.

FIELD OF THE INVENTION

The present invention generally relates to a backup validation engine that provides a comprehensive solution that reduces risk, cuts costs and ensures an entity's assets are correctly backed up while reducing wasted resources.

BACKGROUND OF THE INVENTION

Backup of assets is an important function for an Enterprise from a regulatory as well as disaster recovery perspective. Assets may include servers, databases, host devices and/or other devices, such as Q Trees. A Q-tree may represent a tree data structure where each internal node has multiple children nodes (e.g., four). With constant additions and upgrades of infrastructure, traditional backup processes are prone to fall through the cracks. Some entities may have hundreds of servers and dozens of Q-trees per server. As a result, these entities may have thousands of backup validations that need to be performed on a weekly or periodic basis. Also, issues with certifications, re-certifications, policy renewals, policy applications and other compliance issues may need to be addressed for individual lines of business. A considerable amount of hardware resources such as network, storage and human resources are wasted due to: duplicate backups; inappropriate backups (e.g., DEV/UAT environment being backed up); and incorrect backup policies. DEV represents a development server and database environment (i.e., non-production). UAT represents a user acceptance testing environment which mirrors the production environment for final stage testing before any changes are moved to production. It is not a production environment and therefore does not necessarily require backups to be made. As data is spread across different vendor and in-house tools, such as CMDB, TAMS, Brews, SORD, there are no common integration points to retrieve the backup data easily. In fact, a tremendous amount of effort, time and costs are incurred to identify the breaks.

Currently, there are independent tools in the market focused on solving a specific problem statement, but there is a significant vacuum of solutions that integrates these different products when data flows from one tool to another to generate useful insights based on user driven business logic.

These and other drawbacks exist.

SUMMARY OF THE INVENTION

Accordingly, one aspect of the invention is to address one or more of the drawbacks set forth above. According to an embodiment of the present invention, a backup validation engine comprises: a plurality of data sources comprising a central asset repository; a central repository of backups data; a central repository of network attached storage, a central application portfolio repository; and central repository of tape backup data. The backup validation engine further comprises an interface user interface; and a data mapping processor, coupled to the plurality of data sources and interactive user interface, programmed to: access data from each of the plurality of data sources; map data from the plurality of data sources; identify performance issues comprising: duplicate host policies, hosts back-up, missing backup of hosts, duplicate NAS policies, NAS volume backup, and missing NAS backup; generate a backup validation plan to address one or more performance issues; and automatically initiate the backup validation plan.

According to another embodiment of the present invention, an automated computer implemented method that implements backup validation engine comprises the steps of: accessing data from each of a plurality of data sources, wherein the plurality of data sources comprising a central asset repository; a central repository of backups data; a central repository of network attached storage, a central application portfolio repository; and central repository of tape backup data; mapping, via a data mapping processor, data from the plurality of data sources; identifying performance issues comprising: duplicate host policies, hosts back-up, missing backup of hosts, duplicate NAS policies, NAS volume backup, and missing NAS backup; generating a backup validation plan to address one or more performance issues; and automatically initiating, via an interactive user interface, the backup validation plan.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary illustration of an interactive user interface, according to an embodiment of the present invention.

DESCRIPTION OF EMBODIMENTS OF THE INVENTION

Figure 1:
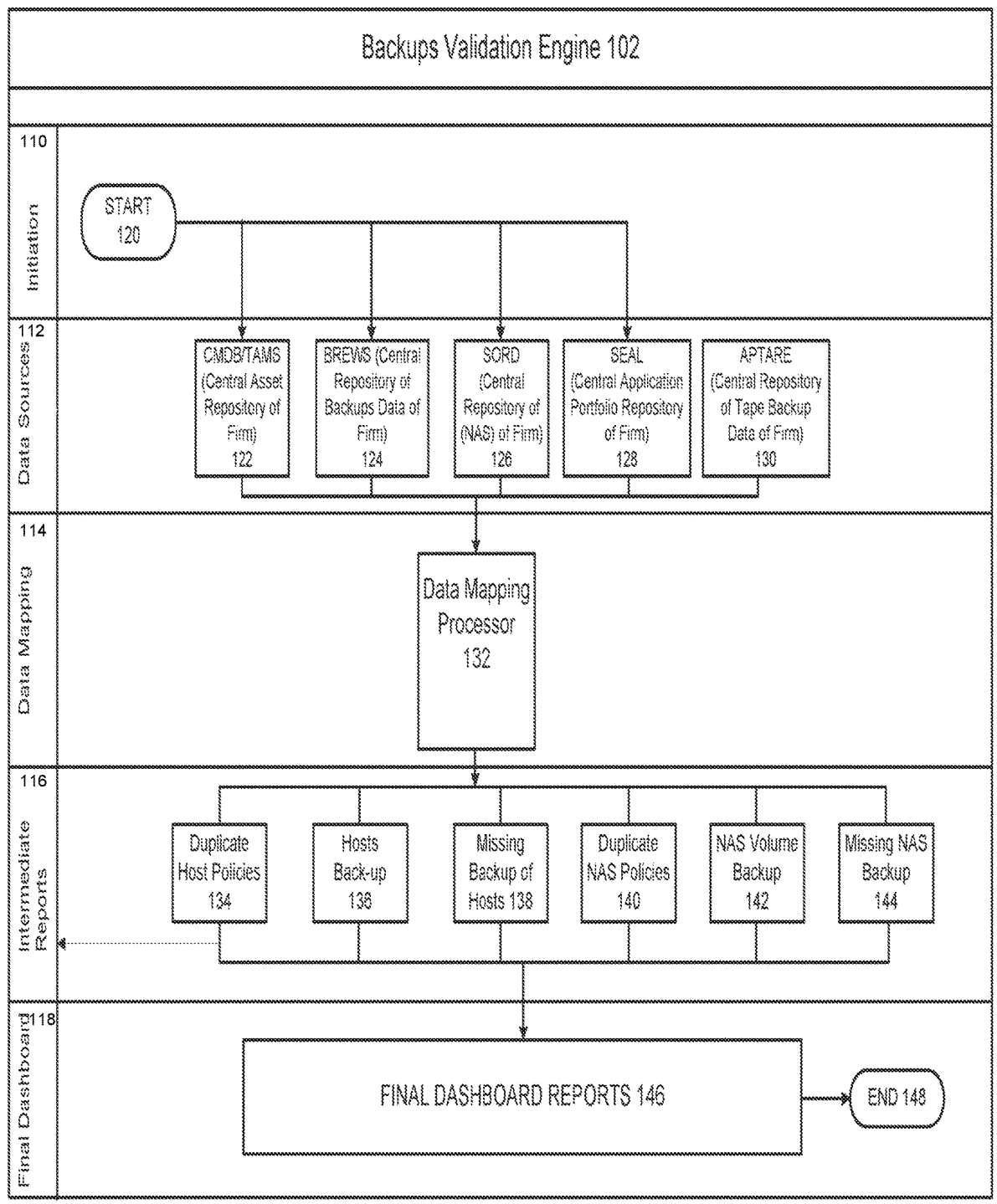
FIG. 1 is an exemplary data flow diagram of a Backup Validation Engine, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a system and method that implements a Backup Validation Engine that provides a comprehensive solution that reduces risk, cuts costs and ensures an entity's assets are correctly backed up while minimizing wasted resources. The Backup Validation Engine may be configurable at a team, group and entity wide level and may provide an interactive user interface, such as a detailed dashboard, aggregating the breaks. An embodiment of the present invention is directed to parsing information systematically from various sources and tools, e.g., vendor and in-house tools, by referencing an entity's central asset catalogue. The Backup Validation Engine is directed to flagging missing back-ups, flagging duplicate backups, flagging DEV/UAT backups (e.g., exceptions may be handled); and flagging incorrect backup policies.

An embodiment of the present invention is directed to handling various scope changes when new assets are allocated and/or old ones decommissioned from a central asset catalogue. The system provides a comprehensive view to application owners, backup administrators and to control owners about the data resiliency capability of an application. The system intelligently connects across various different data sources and drives meaningful information where different users can take action to address specific issues to the user's team, line of business, etc.

An embodiment of the present invention provides the ability to map and effectively highlight breaks with the available raw data from a suite of internal and/or external tools. For example, a mapping activity may involve discovery of records in a firmwide backup database to specific items to backup (e.g., server, database, storage, etc.). Highlighting a break may refer to discovery of a critical item in the production environment (e.g., server, database, storage, etc.) which should have backups enabled; however, a backup record for this specific item may not be present in the firmwide backup database. Conversely, this may also refer to discovery of a database record in the firmwide backup database without a successful backup (e.g., failure of the actual backup action).

An embodiment of the present invention is directed to an interactive interface, e.g., dashboard, where users may run through thousands and thousands of entries and view areas that are missed, incorrect, missing or even failing in a particular area.

Many organizations or entities, e.g., financial institutions, etc., have hundreds of servers with tens of Q-tress per server. These entities may have thousands of backup validations that need to occur on a weekly or periodic basis. A critical component of day-to-day operations is ensuring that reliable backups are being made and properly managed. An entity is further required to manage certifications, re-certifications, policy renewals, policy applications and ensure that individual lines of businesses are compliant for retention records.

An embodiment of the present invention is directed to an interactive interface or dashboard that performs a periodic or ad hoc analysis of thousands and thousands of entries to identify what (if anything) is being missed; whether there are incorrect entries; what is failing in a systemic area, whether there are duplicate entries as well as other issues. An embodiment of the present invention may perform analysis at a service level, a multiservice level, a firm wide level as well as a customized, user defined, project specific level. For example, an embodiment of the present invention may further analyze an entire inventory and identify a recurring error or issue. The information may be identified and analyzed in various formats, e.g., reports, interactive interfaces, alerts, messages, etc. For example, a user may interact with and view the underlying data, e.g., raw data, associated with the analysis.

The interactive interface may represent a web interface with automated pivot tables (or other tool that extracts and filters data) to enable the user to filter and/or organize the data for specific views. For example, a user may view a series of sections of servers, environments, operating system (OS) level where the data may be viewed based on various time periods, e.g., days, as well as by procedure, by number of policies.

An embodiment of the present invention may generate and initiate responsive actions (e.g., remediate action, etc.) based on based on the analysis and feedback. For example, the Backup Validation Engine may provide analysis on individual assets as well as the type of data being backed up (e.g., development data, configuration data, etc.). An interactive interface may identify certain configurations that are targeted for removal and the system may automatically implement removal. For example, the system may identify assets set for decommission and further initiate a decommissioning of the backups. The system may further identify and notify owners of a recommended decommissioning plan. The plan may identify backup issues (e.g., missed data, duplicate backups, retention policies, etc.) and recommend a decommissioning of assets, reconfiguration, update of retention policy. The plan may also provide performance data, savings in cost, time and resources as well as other metrics.

With the Backup Validation Engine, duplicate entries as they exist in a centralized or other repository may be identified and further reduced and/or eliminated. For example, an embodiment of the present invention may recognize that a system implements both a task backup and a corresponding official backup. As a result, the system now has two backup policies backing up the same data likely during different times of the data. An entity is now paying for double the cost for backing up the same data. The Backup Validation Engine is able to analyze the particular policies in question against particular assets and determine that one was set up as a task to make sure that the servers or applications were ready to be within production ready status but was never taken off that status. An entity may then reduce these costs from a daily basis as well as for data retention policies. An embodiment of the present invention may recognize data retention policies that are based on lines of business or in a particular area. Such data retention policies may be effective for many years (e.g., 5, 10, indefinite). An embodiment of the present invention recognizes that there are only a few instances where data needs to be retained indefinitely. Most instances can be managed more efficiently. For example, a bank may have an application or even an entire platform or service that has been retired (and is now obsolete). A retention policy may require the corresponding data to be stored offsite for a period of time, which results in wasted resources and payments for storage that is simply not needed. For certain industries, there may be lines of businesses with very strict limits on data retention and auditing reasons. An embodiment of the present invention achieves a balance between data retention policies and unnecessary and duplicative backups.

According to an exemplary embodiment, an entity may have multiple data sources, where each data source is maintained and managed separately. For example, one data source may host information about inventory and another data source may manage information relating to NAS Q-trees. Another data source may hold information concerning applications, application developer managers, whether the application is retired and whether the application is maintained. Yet another data source may hold information about backups. An embodiment of the present invention is directed to intelligently connect across multiple different data sources and then drive meaningful information concerning backup validations and other related data.

The Backup Validation Engine identifies an entity's risk exposure by identifying servers that are relied upon by various users, teams, divisions, etc., on a daily basis that are not being backup properly or at all. The Backup Validation Engine identifies an amount of waste that currently exists in a system. For example, an entity may perform regular backups on all data maintained by servers, including backups for applications that are retired and/or obsolete. For example, a mobile application may be set to close. Associated data, including transactions, customer configurations, etc. may be stored in a database separate from actual servers that support the data that interfaces with the user. An embodiment of the present invention may remove the data (e.g., configuration data on hardware that is now longer used or even available) and any associated backup process and make sure the information that is needed is secured at the right level at the right time. An entity may continue to pay for server configurations on an application that is now obsolete. An embodiment of the present invention recognizes that the data itself for such applications may have a different control factor than the underlying servers that serve the data.

With the Backup Validation Engine, a user may view data at various levels, e.g., individual user level, line of business level, etc. For example, a user may be responsible for a project, application, etc. The user may then filter the data and view the user's global footprint and view backup costs that are associated with a particular asset or group of assets. For example, the user may filter and view a specific environment that relates to a specific user's production.

An embodiment of the present invention may automate asset configuration, which may be aligned with a default use configuration for a particular line of business, user, department, product, service, etc. For example, for a production, the system may automatically set backup to one year. The production may then be associated with a default line of business, e.g., 5 years. Accordingly, the asset is now associated with a 5 year backup simply due to an natural progression of the production within the entity. The system of an embodiment of the present invention may perform internal checks to ensure that a single policy is associated with an asset and that the policy is appropriate for the current activities associated with the asset. For example, an entity may represent a financial institution that has a line of business, e.g., mobile banking, associated with a particular server or set of servers. The mobile banking line of business may have a 7 year retention policy. For international services, the retention policy may increase to 10 years. An embodiment of the present invention provides baseline configuration options to ensure that risk exposure is reduced significantly by making sure the assets that are aligned to a specific application in the relevant regions are being backed-up appropriately.

For example, retention policies may range and may even be tailored for each particular line of business. Some policies may require transferring data to a particular medium (e.g., backup tapes, etc.) in a particular environment (e.g., fireproof, flood proof, radiation proof area, etc.).

FIG. 1 is an exemplary data flow diagram of a Backup Validation Engine, according to an embodiment of the present invention. FIG. 1 illustrates an initiation stage 110, data sources 112, data mapping process 114, intermediate reports generation 116, and an interactive user interface, such as, a final dashboard 118.

An embodiment of the present invention, may access the system via a read only database connection. The process may be initiated at Start 120. As shown at Data Sources 112, sources of data may include CMDB/TAMS, BREWS, SORD, SEAL and APTARE. Other sources of data may be implemented.

Total Asset Management System (TAMS) may represent a central Asset Repository of an entity. All Assets may be registered in TAMS first before provisioning or an action can be performed on the assets. Data from TAMS may flow into Configuration Management Database (CMDB), for example.

Backup Review Web System (BREWS) may store Backups-related information of the entity. This may include, for example, Backup Time, Backup Status, Backup Policies, Backup Size, Volume names of what is being backed-up etc.

Standards, Engineering & Architecture Library (SEAL) may represent a central tool that stores information related to an Application Portfolio. For example, every Application running on any environment in an entity may be first entered and approved in SEAL.

SORD may represent a central tool that stores information associated with Network Attached Storage (NAS).

APTARE may represent a tool that stores the information related to Tape Data. For example, APTARE data may be in a flat file or other format.

The sources of data illustrated in FIG. 1 are exemplary and for illustration purposes. Other sources of data may be implemented.

Data Mapping 114 may collect data from the various data sources, represented by 112. Intermediate Reports may be generated at 116. For example, an embodiment of the present invention may identify duplicate host policies 134, hosts back-ups 136, missing backup of hosts 138, duplicate NAS policies 140, NAS volume backup 142, missing NAS backup 144 as well as other reports. The reports and other metrics may be presented via an interactive user interface, represented by Final Dashboard Reports 146. The user of the system may perform analysis and automated actions responsive to the reports. Also, data from the reports may be formatted and communicated to various recipients, e.g., owners, managers, etc. The recipients may be internal as well as external to the entity (e.g., regulatory agency, government entity, third party, etc.). The process may be complete at End 148.

Figure 2A:
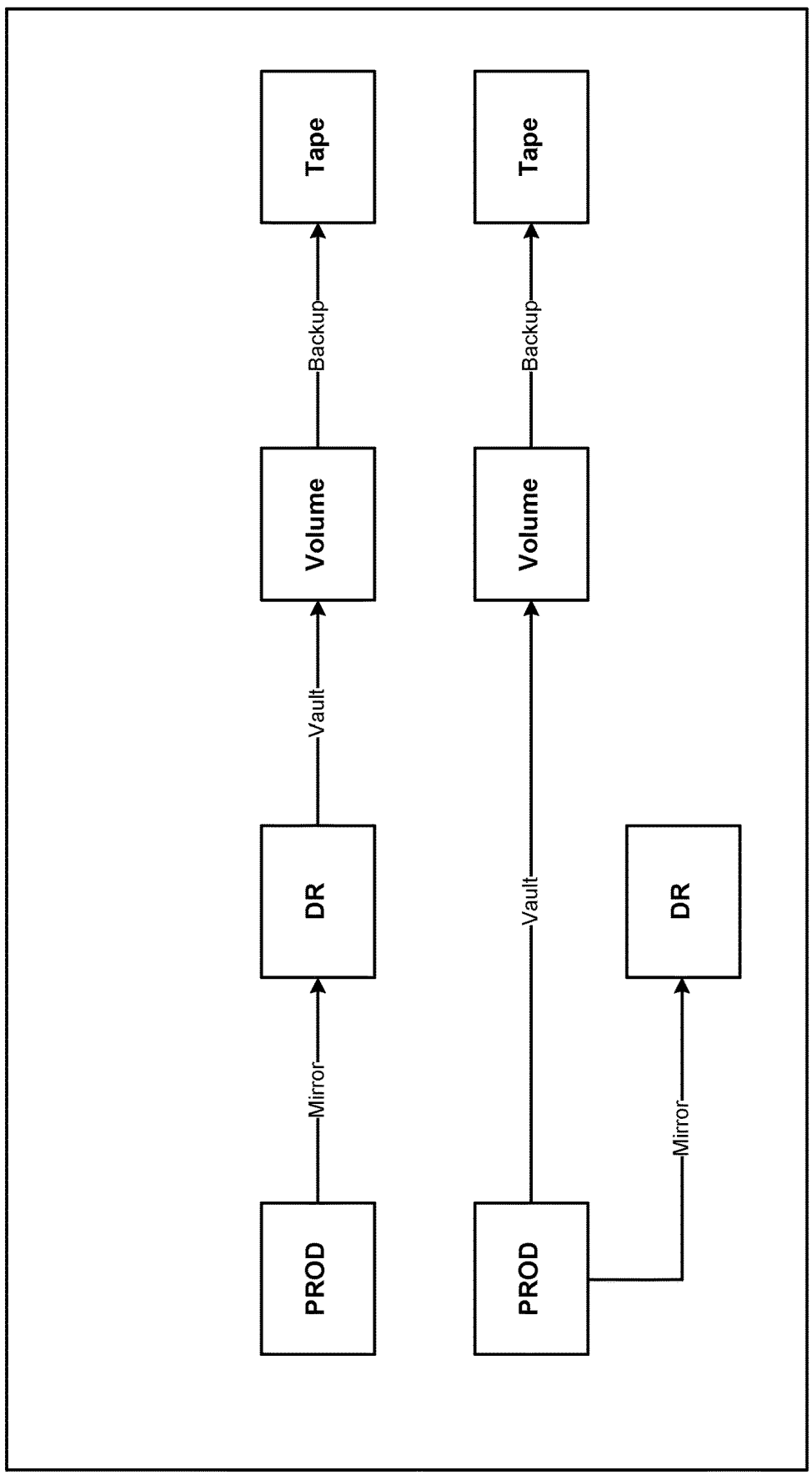
FIGS. 2A, 2B and 2C illustrate exemplary backup scenarios, according to an embodiment of the present invention.
Figure 2B:
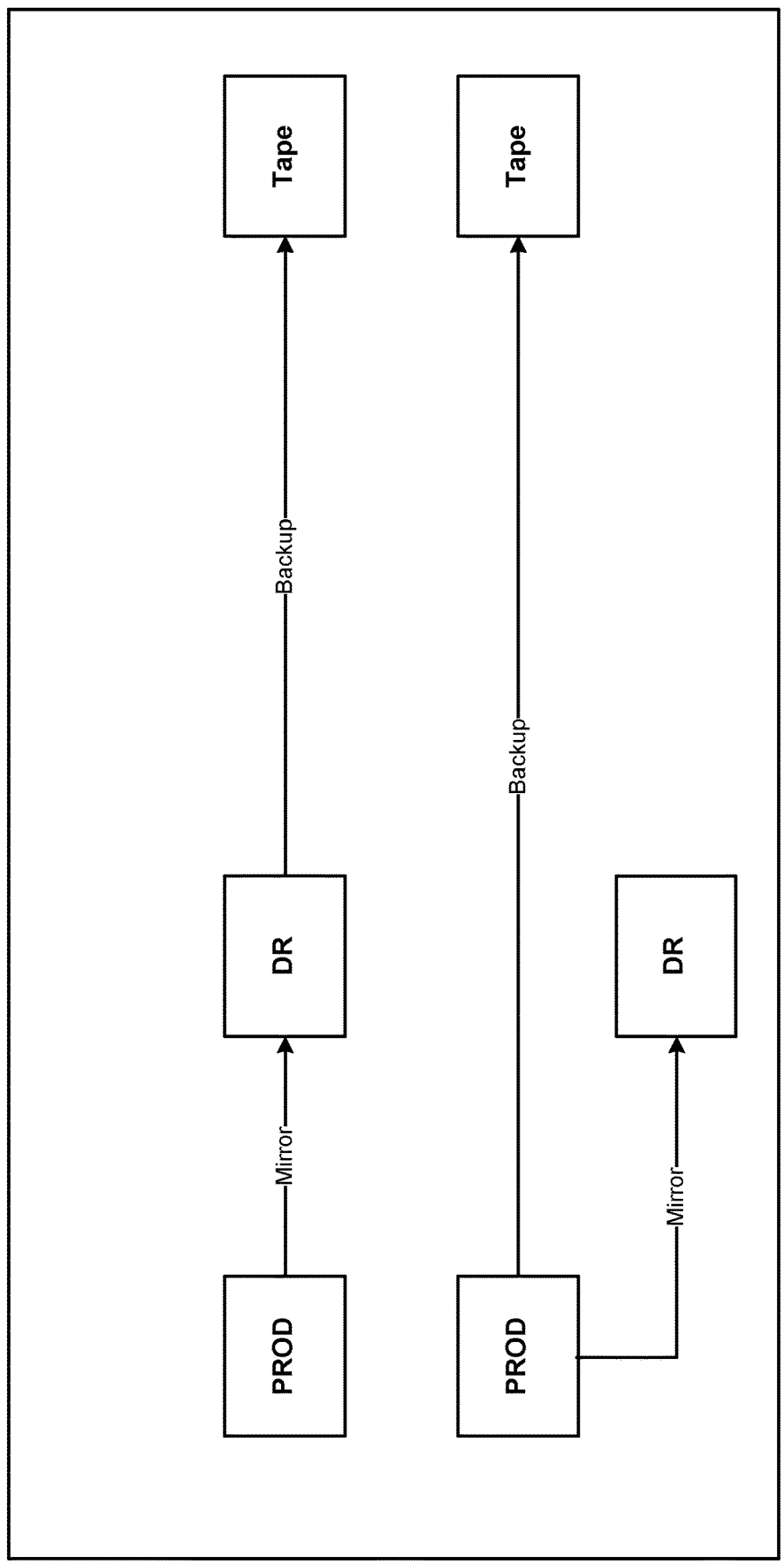
Figure 2C:
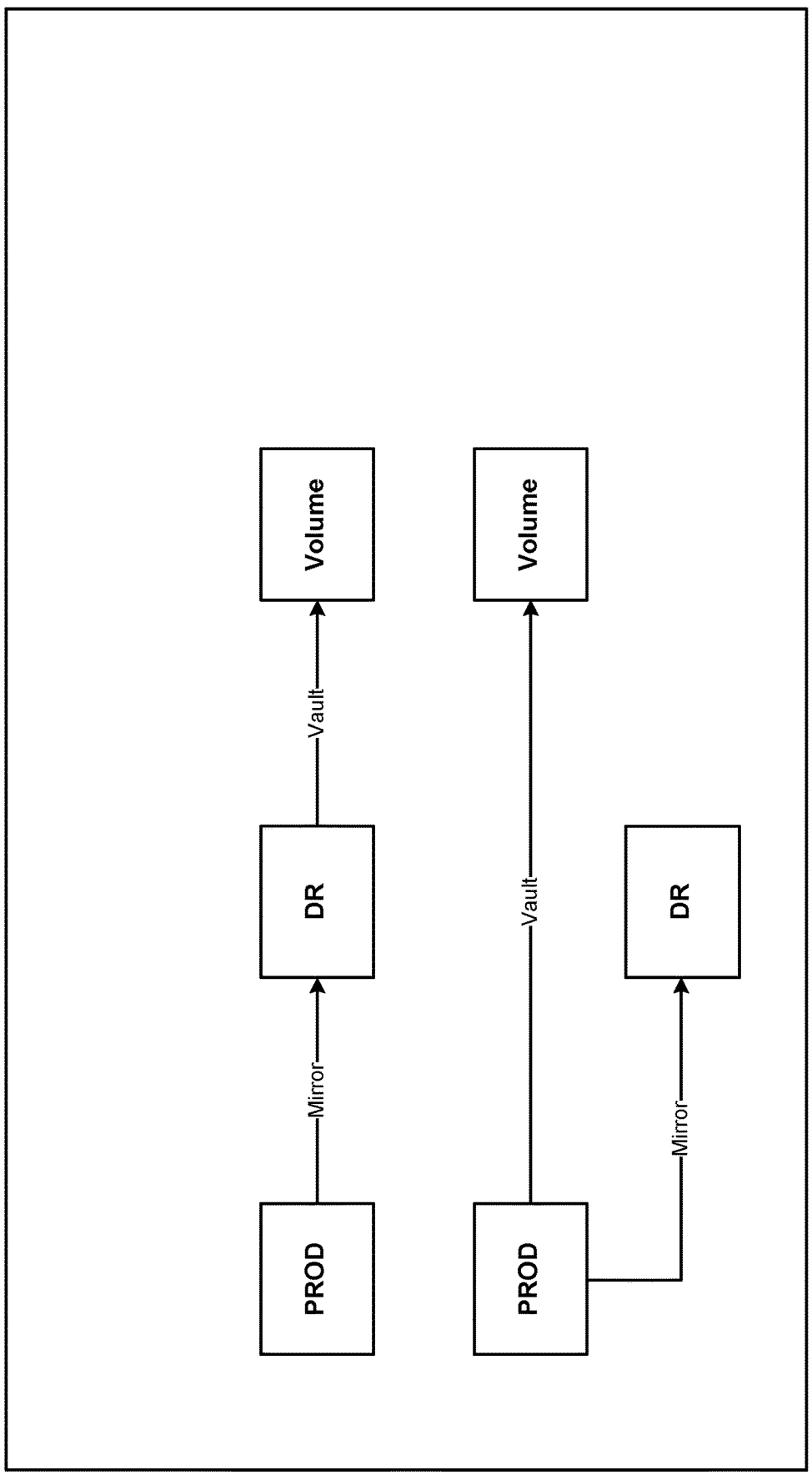

FIGS. 2A, 2B and 2C illustrate exemplary backup scenarios, according to an embodiment of the present invention. An embodiment of the present invention may be directed to determining how NAS Data is backed up. Using this data, an embodiment of the present invention may identify where the data backup flow might break and as a result, fail to get reported. An embodiment of the present invention is further directed to highlighting backup setups that may be incorrect and different from a set of Standards and therefore should be remediated.

FIG. 2A represents a positive backup state, according to an embodiment of the present invention. PROD may represent a Production box from where the Network Attached Storage (NAS) data is replicated. Mirror may represent a feature to copy data from one system to another. For example, Mirror may provide fast, efficient data replication and disaster recovery for critical and other data. DR may represent a Disaster Recovery (DR) site where the data from PROD is copied to. Vault may represent a Backup Technology used for taking backup of source. For example, Vault may maintain a number of read-only versions of data. Vault may take FULL and INCREMENTAL backup of volumes and may also be referred as an online archive as it allows quick restoration of data in case of any data corruption issues. Volume may represent a Vault volume where the data is backed up, which may also refer to an online archive, as data restoration from a vault volume may be performed quickly. Backup may represent a process that moves the data from Vault volumes and/or directly from PROD/DR volumes to Tape. Tape may represent a final state which represents the availability of data on Tape.

As shown in FIG. 2A, PROD data is hitting the Vault volume and data may be stored quickly in case of any data corruption issues in PROD from Vault. Data is then hitting the tape for long term retention. Typically, Vault volume data retention may be set for 60 days (or other time period).

FIG. 2B represents a backup state which can be made more efficient, according to an embodiment of the present invention. As shown in FIG. 2B, PROD data is directly hitting the Tape for long term retention. In case of a data corruption issue, the data restoration has to be done from Tape, which takes more time depending on how the backup policy is scheduled and also on the backup size.

FIG. 2C represents a backup state which requires immediate attention and remediation, according to an embodiment of the present invention. As shown in FIG. 2C, PROD data is not hitting the Tape for long term retention. This scenario is not only risky for the application but may also have regulatory implications and/or other risks for the entity.

Figure 3:
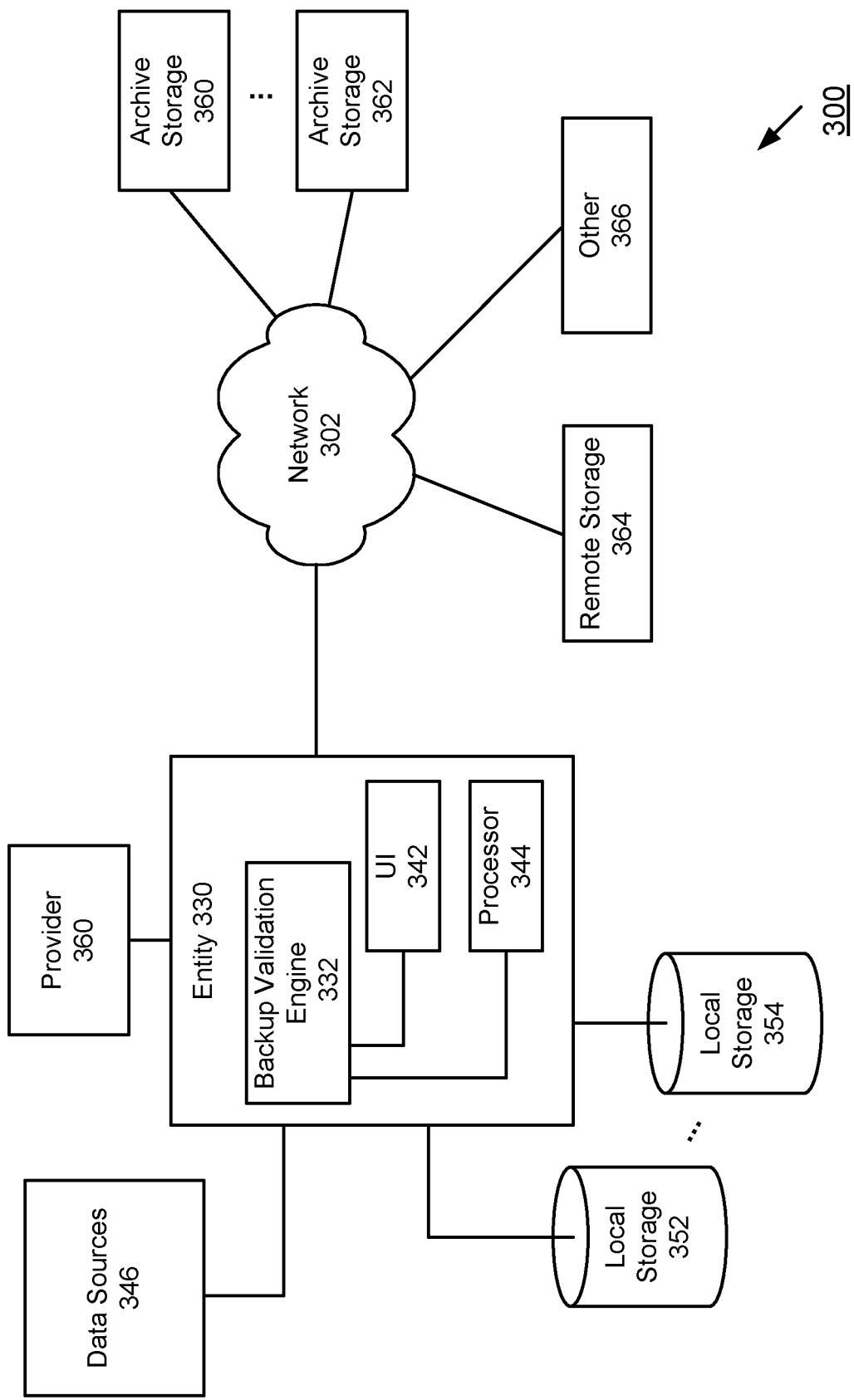
FIG. 3 illustrates a schematic diagram of a system that implements a Backup Validation Engine, according to an exemplary embodiment.

FIG. 3 illustrates a schematic diagram of a system that implements a Backup Validation Engine, according to an exemplary embodiment. As illustrated in FIG. 3, Network 302 may be communicatively coupled with one or more data devices including, for example, computing devices associated with end users. Such devices may include mobile devices, including mobile phones, smart devices, etc. Network 302 communicates with Entity 330 that performs backup validation, system backups, archiving and other storage and maintenance functionality. Entity 330 may include a Backup Validation Engine 332 that automates and facilitates backup validation in accordance with the various embodiments of the present invention. Backup Validation Engine 332 may also incorporate modules and other functions, such as User Interface 342 and Processor 344. These modules are exemplary and illustrative, Backup Validation Engine 332 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Backup Validation Engine 332 may receive inputs from various sources of data, represented by Data Sources 346. Data sources may represent internal as well as external sources of data.

Data may be stored and managed by local storage represented by Local Databases 352, 354. Also, Local Databases 352, 354 may also store and maintain configuration data, application data, customer data, product data, service data as well as other information for day-to-day operations for various product lines, lines of business, etc. The backup validation features described herein may be provided by Entity 330 and/or a third party provider, represented by 360, where Provider 360 may operate with Entity 330.

In accordance with the various features of an embodiment of the present invention, Backup Validation Engine 332 may store and manage data in other locations, such as Archive Storage 360, 362, Remote Storage 364 and other forms of storage represented by 366.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 is depicted, it should be appreciated that other connections and relationships are possible. The system 300 described below may be used to implement the various methods herein, by way of example. Various elements of the system 300 may be referenced in explaining the exemplary methods described herein.

Network 302 may be a wireless network, a wired network or any combination of wireless network and wired network. For example, Network 302 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 302 may support an Internet network, a wireless communication network, a cellular network, Bluetooth, or the like, or any combination thereof. Network 302 may further include one, or any number of the exemplary types of networks mentioned above operating as a stand-alone network or in cooperation with each other. Network 302 may utilize one or more protocols of one or more network elements to which it is communicatively coupled. Network 302 may translate to or from other protocols to one or more protocols of network devices. Although Network 302 is depicted as one network for simplicity, it should be appreciated that according to one or more embodiments, Network 302 may comprise a plurality of interconnected networks, such as, for example, a service provider network, the Internet, a cellular network, corporate networks, or even home networks, or any of the types of networks mentioned above.

Data may be transmitted and received via Network 302 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 3 illustrates individual devices or components, it should be appreciated that there may be several of such devices to carry out the various exemplary embodiments. Entity 330 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 330.

Entity 330 may be communicatively coupled to Local Database 352, 354 as well as Remote Storage represented by 360, 362, 364 and 366. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 302, or communications may involve a direct connection between the various storage components and Entity 330, as depicted in FIG. 3. The storage components may also represent cloud or other network based storage.

Figure 4:
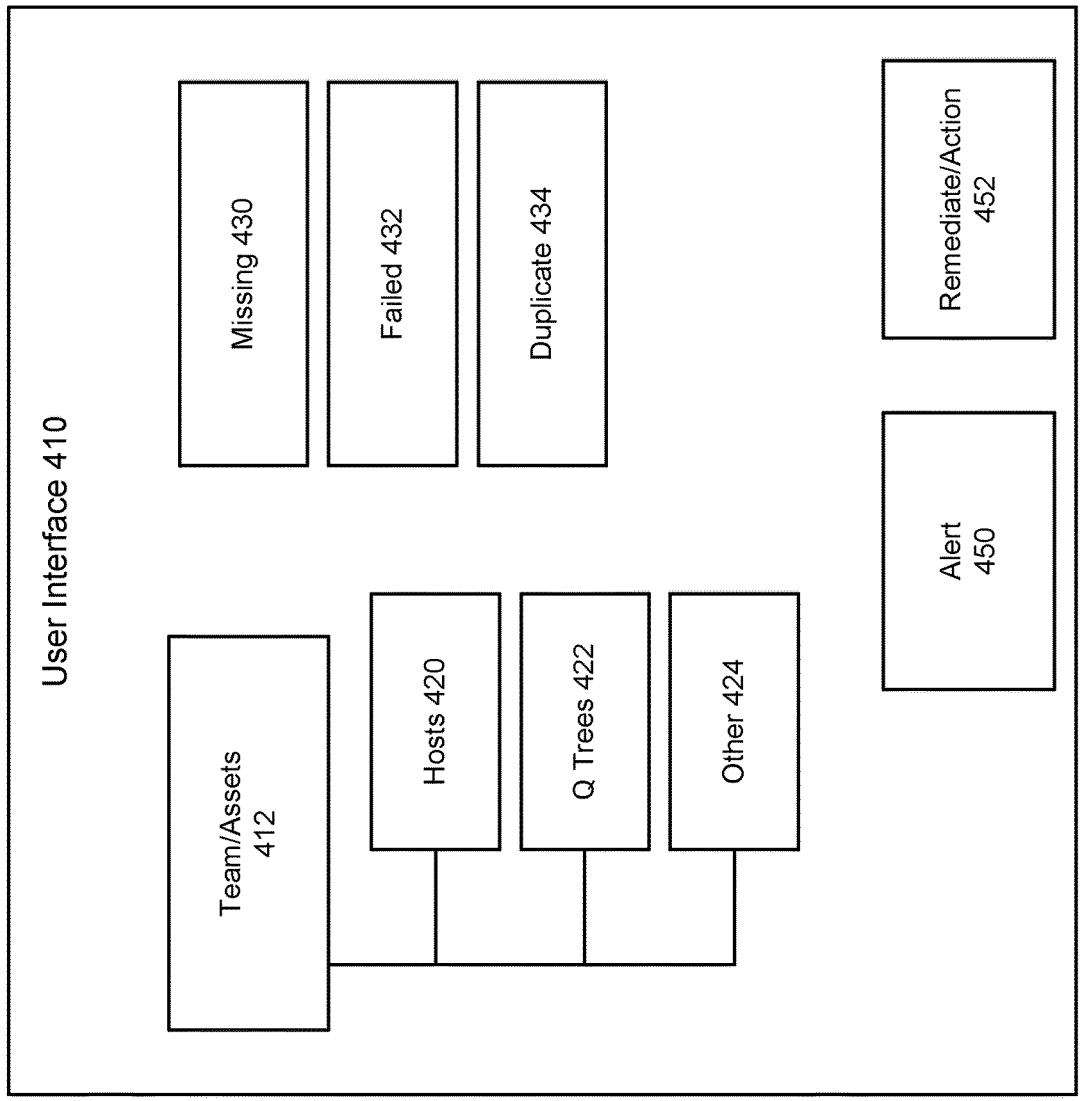
FIG. 4 is an exemplary illustration of an interactive user interface, according to an embodiment of the present invention.

FIG. 4 is an exemplary illustration of an interactive user interface, according to an embodiment of the present invention. User Interface 410 may represent an interactive interface accessible by various user devices, including computing devices, mobile devices, etc. As shown in FIG. 4, User Interface 410 may identify and analyze backup data and procedures associated with Teams, Assets and/or other segment or group, represented by Team/Assets 412. Backup Validation Engine may identify and analyze data relating to Hosts 420, Q Trees 422, and/or other assets or data structure represented by Other 424. Backup Validation Engine may identify potential candidates for attention and correction, such as missing entries at 430, failed entries at 432 and duplicate entries at 434. User Interface 410 may provide actions, such as sending an alert, at 450 and initiating an Action, represented by Remediate/Action 452. Other actions and responses may be identified and automatically initiated.

These modules are exemplary and illustrative, User Interface 410 may provide additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

FIG. 5 is an exemplary illustration of an interactive user interface, according to an embodiment of the present invention. In this exemplary embodiment, FIG. 5 illustrates a dashboard interface. According to an exemplary illustration, the interface may highlight duplicates, inappropriate and incorrect backups. The rows may include various metrics and data including, for example: ALL_Hosts_In_Brews may represent a count of all hosts in TAMS that are backed up in BREWS. DEV_Hosts may represent a count of all DEV hosts in TAMS that are backed up in BREWS. UAT_Hosts may represent a count of all UAT hosts in TAMS that are backed up in BREWS. PROD/DR_Hosts may represent a count of all PROD/DR hosts in TAMS that are backed up in BREWS. Missing_Hosts may represent a count of all hosts that are available in TAMS but are not backed up in BREWS. Failed_Hosts Backup may represent a count of all hosts where backup has failed in BREWS (Full Backup OR Incremental Backup). ALL_QTrees_In_Brews may represent a count of all Q-Trees being backed up in BREWS. QTrees_DEV_HostAccess may represent a count of all Q-Trees that can be mounted on any of the DEV hosts. QTrees UAT HostAccess may represent a count of all Q-Trees that can be mounted on any of the UAT hosts. QTrees_PROD/DR_HostAccess may represent a count of all Q-Trees that can be mounted on any of the PROD/DR hosts. Missing_QTrees may represent a count of all Q-Trees that can be mounted on any of the PROD/DR hosts and are not being backed up in BREWS. Failed_Qtrees_Backup may represent a count of all Q-Trees where backup has failed in BREWS (Full Backup OR Incremental Backup). Dup_Host_Policies may represent a count of Duplicate Policies associated with hosts that are being backed up in BREWS. Dup_QTree_Policies may represent a count of all Duplicate Policies associated with Q-Trees that are being backed up in BREWS. Multiple_Host_Env may represent a count of different environments associated with one host in TAMS.

As shown in FIG. 5, the metrics may be applied across various teams, groups, etc. The teams may include: X3CDOGOFASTOPERATE may represent a Queue Identifier for one of the Support Teams. X3CDOGOSCM may represent a Queue Identifier for one of the Support Teams. X3CDOGOEQC may represent a Queue Identifier for one of the Support Teams. Additional teams, groups and/or other units may be added.

By selecting on a "Fixit" icon, an embodiment of the present invention may present additional documentation, data and/or interfaces that provide the steps required or suggested to fix or address the issue. For example, an embodiment of the present invention may provide a step-by-step guide. The interface may provide information to address the specific issues, e.g., submit PRIME request for the purpose of adding Tape backup policy and/or schedule to an existing NAS Q-tree. The step-by-step guide may include pre-requisites and/or other information. In this example, the user may be instructed to access PRIME with a link on how to obtain the suggested or required access. Next, the user may be instructed to contact a product owner to obtain the correct Prime Forecast and Prime Project associated with the Prime Forecast information and further ask the product owner to add the user to appropriate projects with "edit" or other access which may be considered a pre-requisite for the user's ability to submit PRIME requests against that project. Training courses and other relevant information may also be presented. According to another embodiment of the present invention, the "Fixit" icon may automatically initiate one or more steps, contacts and/or actions relevant to the underlying issue to further expedite the validation process.

By interacting with a count number, shown in FIG. 5, an embodiment of the present invention may provide more information to the Application Team. For example, raw data may include a list of hosts for which the backup has failed (e.g., Failed Backup: Host_ABC000; Host_ABC001). This information may be used to determine impact and also drill down and access information on the impacted assets.

The interface illustrated in FIG. 5 may be accessed from various user devices, including computers, mobile devices, smart phones, wearables, etc.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented method for improving data back-up process, comprising the steps of:
    accessing one or more data flows among plurality of back-up data collection sources associated with a plurality of central data repositories;
    analyzing the one or more data flows to identify one or more breaks in data back-up process associated with one or more data items with missing back-up records;
    identifying, based on the analysis of the one or more data flows, one or more duplicate data back-up records;
    identifying, based on the analysis of the one or more data flows, one or more data back-up processes, associated with one or more back-up data collection sources, that deviate from a prescribed standard;
    generating a backup validation plan to address the one or more breaks in data back-up process, the one or more duplicate data back-up records, and the one or more data back-up processes that deviate from a prescribed standard; and
    automatically initiating, via an interactive user interface, the backup validation plan.

2. The method of claim 1, wherein the plurality of central data repositories comprise a central asset repository, a central repository of backup data, a central repository of network attached storage, a central application portfolio repository, and a central repository of tape backup data.

3. The method of claim 1, further comprising identifying, based on the analysis of the one or more data flows, one or more systematic errors in an operation of one or more back-up data collection sources.

4. The method of claim 1, further comprising identifying, based on the analysis of the one or more data flows, one or more data records for removal from the data back-up process.

5. The method of claim 4, wherein the identifying of the one or more data records for removal from the data back-up process comprises an identification of one or more data retention policies that are no longer applicable to corresponding one or more data records.

6. The method of claim 4, wherein the one or more data records correspond to configuration data.

7. The method of claim 1, wherein the interactive user interface provides access to a step-by-step guide to address one or more underlying issues.

8. The method of claim 1, wherein the interactive user interface provides access to raw data relevant to an underlying issue.

9. The method of claim 1, wherein the interactive user interface is accessed from plurality of user devices comprising computers, mobile devices and wearables.

10. The method of claim 1, further comprising accessing and processing one or more data flows from one or more external back-up data collection sources.

* * * * *